United States Patent [19]
Williams et al.

[11] Patent Number: 5,284,690
[45] Date of Patent: Feb. 8, 1994

[54] AQUEOUS RELEASE COATING COMPOSITION FOR PRESSURE SENSITIVE ADHESIVES

[75] Inventors: Martin M. Williams, Harrisburg; Rodney J. Trahan, Jr., China Grove, both of N.C.

[73] Assignee: Rohm and Haas Company, Philadelphia, Pa.

[21] Appl. No.: 971,027

[22] Filed: Nov. 3, 1992

[51] Int. Cl.$^5$ ............................................. B32B 7/06
[52] U.S. Cl. .................................... 428/40; 428/352; 428/353; 428/354; 428/480; 525/56; 106/2
[58] Field of Search ................. 428/40, 352, 353, 354, 428/480; 525/56; 106/2

[56] References Cited

U.S. PATENT DOCUMENTS

| | | | |
|---|---|---|---|
| 2,607,711 | 8/1952 | Hendricks | 428/40 |
| 3,067,057 | 12/1962 | Dabroski | 428/352 |
| 3,285,771 | 11/1966 | Dabroski | 428/352 |
| 3,475,196 | 10/1969 | Bartell et al. | 428/246 |
| 3,502,497 | 3/1970 | Crocker | 428/311.1 |
| 3,583,932 | 6/1971 | Benton | 428/40 |
| 3,690,924 | 9/1972 | Estes | 428/352 |
| 3,773,538 | 11/1973 | Milutin et al. | 242/159 |
| 3,928,690 | 12/1975 | Settineri et al. | 428/40 |
| 3,933,702 | 1/1976 | Caimi et al. | 524/44 |
| 3,967,031 | 6/1976 | Lambert | 428/294 |
| 3,978,274 | 8/1976 | Blum | 428/476 |
| 4,313,988 | 2/1982 | Koshar et al. | 428/40 |
| 4,379,806 | 4/1983 | Korpman | 428/352 |
| 4,513,059 | 4/1985 | Dabroski | 428/355 |
| 4,587,156 | 5/1986 | Wu | 428/207 |
| 4,599,260 | 7/1986 | Truskolaski et al. | 428/207 |

FOREIGN PATENT DOCUMENTS 30179 2/1987 Japan .

OTHER PUBLICATIONS

"The Lechithin Book" product literature from Central Soya Company, Inc., Fort Wayne, Ind.
R. A. Bafford and G. E. Faircloth, "Silicone-Free Release Coatings Need No Post-Drying Cure Step," Adhesive Age, Dec. 1987.
Donatas Satas, Chapter 23 "Release Coatings," Handbook of Pressure Sensitive Adhesive Technology.
J. E. Young, "Water-Based Acrylic Release Coatings," Proceedings of the Pressure Sensitive Tape Council Technical Meeting on Water-Based Systems, Chicago, Ill., Jun. 21-22, 1978, pp. 100-105.
"Nonsilicone Release Coatings" product literature from Air Products, Inc., Langely, S.C.

*Primary Examiner*—Donald J. Loney
*Assistant Examiner*—Nasser Ahmad

[57] ABSTRACT

This invention is directed to an article comprising a backing layer, at least one pressure sensitive adhesive layer, and an aqueous release coating layer, wherein the pressure sensitive adhesive layer is affixed to at least one side of the backing layer and the aqueous release coating layer comprises a polymer, preferably having acid functionality, and an aqueous solution or dispersion of an organic compound having at least one fatty acid ester and at least one quaternary amine.

A method of using a mixture of a polymer, preferably having acid functionality, and an aqueous solution or dispersion of an organic compound having at least one fatty acid ester and at least one quaternary amine as a release coating is also disclosed.

The aqueous release coating layer permits the pressure sensitive adhesive layer to be easily separated from the backing layer, even after storage for long durations and under extreme temperature and humidity conditions. The aqueous release coating does not migrate into the pressure sensitive adhesive layer and interfere with the adhesive properties of the pressure sensitive adhesive.

12 Claims, No Drawings

AQUEOUS RELEASE COATING COMPOSITION FOR PRESSURE SENSITIVE ADHESIVES

BACKGROUND OF THE INVENTION

This invention relates to an aqueous release coating composition for pressure sensitive adhesives.

Pressure sensitive adhesives have widespread use as bonding agents for films, foil, and paper for tapes, labels and decals. Films, foil, and paper for tapes, labels and decals will be hereafter referred to as "backing". The adhesive may be coated onto one or both sides of the backing. The side of the backing coated with adhesive will be referred to hereafter as the "adhesive-coated backing side".

In tapes, for example, the adhesive-coated backing is typically wound onto itself to form a roll where the adhesive-coated backing side is in direct contact with the upper surface of the continuous backing layer in the roll which typically does not contain adhesive. The side of the backing not coated with adhesive but coated with a material which functions as a release agent will be referred to hereafter as the "release-coated backing side". In certain cases, both sides of the backing may be coated with adhesive and a release-coat paper containing a separate backing and a release coating may be applied onto one or both sides of these adhesive-coated backing sides. Hereinafter a backing having both sides coated with adhesive will be referred to as "double adhesive coated backing" and the side or sides which contain the release-coat paper will be referred to as the "release-coated paper side." The adhesive must release cleanly from the release-coated backing side or release-coated paper side without causing damage or leaving any adhesive residue on the release-coated backing side or release-coated paper side.

Forming rolls from the adhesive-coated backing imposes an additional requirement on the adhesive. The adhesive must have differential affinity for the two sides of the backing, such that the adhesive preferentially adheres to the coated backing side with no subsequent transfer to the uncoated backing side of the adjacent layer when the backing is unrolled.

There are two methods which result in differential affinity of the adhesive towards the two sides of the backing—the primer coating method and the release coating method. In the primer coating method, an adhesive is selected which does not adhere to the backing and a primer coat is used to make the adhesive bond to the backing. The primer coat is first applied to the backing and then the adhesive is applied onto the primer coat. When the adhesive-coated backing is rolled, the adhesive on the adhesive-coated backing side contacts the backing side which does not contain adhesive but does not adhere to it. Examples of this method are solvent-based natural rubber adhesives coated on unplasticized polyvinyl chloride film and aqueous-based acrylic adhesives coated on oriented polypropylene film where the coated backing side has been "primed" by corona discharge treatment.

In the release coating method, a release coat is applied to the backing side which does not contain adhesive ("release-coated backing side") and an adhesive is applied the opposite backing side ("adhesive-coated backing side"). The release coat has a strong affinity for the backing but a weak affinity for the adhesive. Release coats are typically used with solvent-based natural rubber adhesives and hot-melt block copolymers coated on oriented polypropylene film.

Release coating may alternatively may be applied to a separate backing which is subsequently applied to the adhesive-coated side of the backing (hereinafter referred to as "release-coat paper.")

There are several requirements which a coating must meet to function as a release coating. It must exhibit low affinity toward the adhesive with which it will directly contact when the backing is wound into a roll. This low affinity must be maintained over time and under temperature and humidity fluctuations and extremes. However, the release coating must not reduce the adhesive bonding between the backing and the adhesive to such an extent that the roll "telescopes." The release coating must also strongly bond to the backing side so that it does not delaminate when aggressive adhesives are used. Further, components of the release coating must not migrate into the adhesive, thereby deteriorating the properties of the adhesive.

It is also desirable for safety, health and environmental reasons to use a release coat which is aqueous and does not contain solvents.

SUMMARY OF THE INVENTION

This invention is directed to an article comprising a backing layer, at least one pressure sensitive adhesive layer, and an aqueous release coating layer, wherein the pressure sensitive adhesive layer is affixed to at least one side of the backing layer and the aqueous release coating layer comprises a polymer, preferably having acid functionality, and an aqueous solution or dispersion of an organic compound having at least one fatty acid ester and at least one quaternary amine.

This invention is also directed to a method of using a mixture of a polymer, preferably having acid functionality, and an aqueous solution or dispersion of an organic compound having at least one fatty acid ester and at least one quaternary amine as a release coating.

The aqueous release coating layer permits the pressure sensitive adhesive layer to be easily separated from the backing layer, even after storage for long durations and under extreme temperature and humidity conditions. The aqueous release coating does not migrate into the pressure sensitive adhesive layer and interfere with the adhesive properties of the pressure sensitive adhesive.

DETAILED DESCRIPTION OF THE INVENTION

The pressure sensitive adhesive articles of this invention, such as for examples tapes, films and labels, are composed of at least three components:
(1) backing;
(2) pressure sensitive adhesive; and
(3) aqueous-based release coating
where either:
(1) the pressure sensitive adhesive is applied to one side of the backing ("adhesive-coated backing side") and the release coat is applied to the opposite side of the backing ("release-coated backing side"); or
(2) the pressure sensitive adhesive is applied to both sides of the backing ("double adhesive-coated backing") and the release coating is contained in release-coat paper which is subsequently applied to least one adhesive-coated backing side.

The backings of this invention are conventional materials, such as for example plastics including unplasticized polyvinyl chloride, polyethylene, polypropylene, polyester, and other substrates used in self-wound tapes; paper including crepe or flat paper and those used in masking tapes; nonwovens including cellulosics; and the like. Typically the backing thickness is from about 20 μm to about 40 μm.

The pressure sensitive adhesives of this invention are conventional materials, such as for example, aqueous acrylic adhesives; solvent-based rubber adhesives including cis-1,4-polyisoprene; hot-melt block copolymer adhesives; synthetic rubbers including styrene-butadiene rubber; and the like.

Applicants have discovered a novel pressure sensitive adhesive article which contains a conventional backing material and a conventional pressure sensitive adhesive with a novel release coating composition. The release coating composition useful in this invention must contain a polymer and an aqueous solution or dispersion of an organic compound having at least one fatty acid ester and at least one quaternary amine. The organic compound having at least one fatty acid ester and at least one quaternary amine is incorporated with the polymer at a level of from about 0.1% by dry weight to about 50% by dry weight, based on the dry weight of the polymer, preferably 1% by dry weight to about 10% by dry weight.

The release coating composition of this invention contains a water-soluble polymer, a latex polymer or a mixture thereof.

Examples of the water-soluble polymers include polyacrylates, polyacrylamides, polyvinyl alcohol, cellulosic polymers and the like.

"Latex" as used herein refers to a water-insoluble polymer which may be prepared by conventional polymerization techniques such as, for example, by emulsion polymerization. The latex polymer useful in the release coating composition may be prepared by emulsion polymerization techniques well known in the art.

A wide variety of monomers or mixture of monomers can be used to make the latex polymer. For example, acrylic ester monomers, including methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate, octyl acrylate, isooctyl acrylate, 2-ethylhexyl acrylate, decyl acrylate, isodecyl acrylate, lauryl acrylate, bornyl acrylate, isobornyl acrylate, myristyl acrylate, pentadecyl acrylate, stearyl acrylate and the like; methacrylic acid ester monomers, including methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate, stearyl methacrylate and the like; acrylic acid, methacrylic acid, itaconic acid, maleic acid, fumaric acid, styrene, substituted styrenes, butadiene, acrylonitrile, ethylene, vinyl acetate, acrylamide and the like may be used.

Preferably, the water-soluble polymer or a latex polymer useful in the release coating composition of this invention contains acid functionality. The acid functionality may be incorporated in the polymer by incorporating acid-containing monomers into the polymer. Useful acid-containing monomers include those monomers having carboxylic acid functionality, such as for example acrylic acid, methacrylic acid, itaconic acid, fumaric acid, citraconic acid; phospoethyl methacrylate and the like.

Preferably, the polymer useful in the release coating composition of this invention is nonionically stabilized. Suitable nonionic stabilizers include alkylphenoxypoly ethoxyethanols having alkyl groups of from about 7 to 18 carbons atoms and from about 6 to about 60 oxyethylene units, such as heptylphenoxypolyethoxyethanols, methyloctylphenoxypolyethoxy ethanols, and the like; polyethoxyethanol derivatives of methylene-linked alkyl phenol; sulfur-containing agents such as those made by condensing from about 6 to about 60 moles of ethylene oxide with nonyl mercaptan, dodecyl mercaptan, and the like, or with alkylthiophenols wherein the alkyl groups contain from 6 to 16 carbons atoms; ethylene oxide derivatives of long-chained carboxylic acids, such as lauric acid, myristic acid, palmitic acid, oleic acid, and the like, or mixtures of acids such as those found in tall oil containing from 6 to 60 oxyethylene units per molecule; analogous ethylene condensates of long-chained alcohols such as octyl, decyl, lauryl, or cetyl alcohols, ethylene oxide derivatives of etherified or esterified polyhydroxy compounds having a hydrophobic hydrocarbon chain, such as sorbitan monostearate containing from 6 to 60 oxyethylene units; also, ethylene oxide sections combined with one or more hydrophobic propylene oxide sections. Mixtures of alkyl benzenesulfonates and ethoxylated alkylphenols may be employed.

Useful organic compounds having at least one fatty acid ester and at least one quaternary amine include diglycerides and triglycerides with a quaternary amine functional group replacing one of the fatty acid groups. Examples of these compounds include lecithin, hydroxylated lecithin and lecithin derivatives, such as for example, phosphalidycholine and phosphatidylethanolamine, and the quaternary ammonium salt of tallow. Fatty hydroxylated, ethoxylated and propoxylated quaternary and diquaternary amines are also useful in the release coating composition of this invention. Many compounds are naturally occurring. For example, lecithin is a naturally occurring mixture of phospholipids having both a hydrophilic portion and a hydrophobic portion and is found in most living cells. The primary source of commercial lecithin comes from the soybean.

In addition, conventional coating components such as, for example, pigments, binders, vehicles, extenders, dispersants, surfactants, coalescents, wetting agents, rheology modifiers, thickeners, drying retarders, antifoaming agents, colorants, waxes, preservatives, heat stabilizers, ultraviolet light absorbers and the like may be used in the release coating of this invention.

The release coating may be applied to the backing by knife coating, roller coating and print coating. After the release coat is applied to the flexible backing, it may be dried by heating. The dry weights of the release coats which are useful in this invention are from about 0.01 gram per square meter to about 10 grams per square meter according to the selection of backing and pressure-sensitive adhesive and coating technique. Dry weights of the release coats from about 0.1 gram per square meter to about 2.0 grams per square meter are preferred.

The following examples are intended to illustrate the invention; they are not intended to limit the invention as other applications of the invention will be obvious to those of ordinary skill in the art.

EXAMPLE 1

Preparation of Release Coating Compositions

The release coating compositions were prepared by mixing together the ingredients listed in Table 1. The release coatings were diluted to 35% solids with water for Release Coating 1 and 28% solids with water for Release Coatings 2 and 3. The release coatings were then scrape-coated onto 32 pound/ream crepe backing and dried for one minute at 275° F. to give an add-on of 3.5 pounds/ream.

TABLE 1

| Ingredient | Release Coating 1 | Release Coating 2 | Release Coating 3 |
|---|---|---|---|
| Water | — | 2.00 grams[6] | 2.18 grams |
| Aqueous ammonium hydroxide | — | 0.30 grams | — |
| Lecithin (12.5% by weight in water)[1] | 1.70 grams | — | — |
| Tallow trimethyl quaternary ammonium chloride salt (27% by weight in water)[2] | — | 1.85 grams | 1.85 grams |
| Acrylic latex polymer (45.2% solids)[3] | 27.6 grams | — | — |
| Acrylic latex polymer (46% solids)[4] | — | 13.59 grams[6] | 13.59 grams[6] |
| Water-soluble polymer (14% by weight in water)[5] | — | — | 2.78 grams[6] |
| Release coating solids | 43.3% | 38% | 35% |
| pH | 8.5–9.0 | 8.5–9.0 | 8–9 |

[1]Dispersed Alcolec FF-100 lecithin from American Lecithin Company - pH adjusted to 8.5-9 with ammonium hydroxide
[2]Arquad T-27W tallow trimethyl quaternary ammonium chloride salt from Akzo Chemicals, Inc.
[3]RES 68510 low surfactant, anionically stabilized acrylic latex with acid functionality from Rohm and Haas Company
[4]RES 3112 nonionically stabilized acrylic latex without acid functionality from Rohm and Haas Company
[5]RES 8615-3 water-soluble polymer with acid functionality from Rohm and Haas Company
[6]Premixed together before adding to latex polymer

EXAMPLE 2

Preparation of Test Specimens

The release coating compositions (Release Coatings 1, 2 and 3) were evaluated to determine their effective in functioning as release coatings for pressure sensitive adhesives.

Adhesion Test Specimens

Strips (1 inch wide and 10 inches long) of commercial masking tape were placed with the pressure sensitive adhesive on the the release coated side of the crepe backing prepared according to Example 1 to form the test specimen. The excess backing was trimmed from the test specimen. The test specimen was then subjected to a 0.5 bar pressure to insure complete adhesion between the pressure sensitive adhesive of the masking tape and the release coating on the crepe backing.

Test specimen were either prepared at room temperature and immediately tested or prepared and aged for 3 days at 180° F. in a hot box to simulate long term storage. Test specimens placed in the hot box were weighted with a 1-inch metal bar to give 0.28 pounds/square inch pressure to simulate the pressure encountered in a roll of conventional tape.

Readhesion Test Specimens

Strips (1 inch wide and 10 inches long) of commercial masking tape were placed with the pressure sensitive adhesive on the the release coated side of the crepe backing prepared according to Example 1 to form the test specimen. The excess backing was trimmed from the test specimen. The test specimen was then subjected to a 0.5 bar pressure to insure complete adhesion between the pressure sensitive adhesive of the masking tape and the release coating on the crepe backing.

Test specimen were either prepared at room temperature and immediately tested or prepared and aged for 3 days at 180° F. in a hot box to simulate long term storage. Test specimens placed in the hot box were weighted with a 1-inch metal bar to give 0.28 pounds/square inch pressure to simulate the pressure encountered in a roll of conventional tape.

The masking tape portion was then manually separated from the released coated portion. The masking tape was then placed on a stainless steel panel in accordance with Pressure Sensitive Tape Council (PSTC) standards.

EXAMPLE 3

Adhesion Testing of Release Coating Compositions

The adhesion properties of the test specimens were evaluated using a T-peel test on an Instron Testing Machine (Model 1011). The T-peel tests were measured at room temperature at a rate of 12 inches/minute. The results are shown in Table 2.

TABLE 2

| | Release (ounces/inch) | |
|---|---|---|
| | Initial | Aged |
| Release Coating 1 | 7.9 | 9.6 |
| Release Coating 2 | 5.7 | 12.3 |
| Release Coating 3 | 8.4 | 12.2 |

Each of the release coatings performed well when tested immediately after having been applied to the pressure sensitive adhesive as compared to performance of typical pressure sensitive adhesives having no release coating applied. The increase in the release after aging for 3 days at 180° F. in a hot box to simulate long term storage was also acceptable.

EXAMPLE 4

Readhesion Testing of Release Coating Compositions

The readhesion properties of the test specimens were evaluated using a 180° Peel, a 90° Peel and a 90° Quik-Stick test in accordance with Pressure Sensitive Tape Council (PSTC) standards. The results are shown in Table 3.

TABLE 3

| | Readhesion (ounces/inch) | | | | | |
|---|---|---|---|---|---|---|
| | 180° Peel | | 90° Peel | | 90° Quik-Stick | |
| | Initial | Aged | Initial | Aged | Initial | Aged |
| Release Coating 1 | 33.5 | 30.5 | 23.2 | 20.9 | 16.8 | 16.0 |
| Release Coating 2 | 29.3 | 26.2 | 19.0 | 18.0 | 11.1 | 10.1 |
| Release Coating 3 | 32.5 | 27.6 | 21.1 | 19.1 | 12.7 | 10.8 |

Each of the release coatings performed well when tested immediately after having been applied to the pressure sensitive adhesive as compared to performance of typical pressure sensitive adhesives having no release coating applied. The readhesion after aging for 3 days at 180° F. in a hot box to simulate long term storage showed an acceptable decrease indicating that the release coatings did not substantially migrate into and detrimentally affect the pressure sensitive adhesive's adhesion and readhesion properties.

We claim:

1. An article comprising a backing layer, at least one pressure sensitive adhesive layer, and an aqueous release coating layer, wherein said pressure sensitive adhesive layer is affixed to one side of said backing layer and said aqueous release coating layer is provided on the opposite side thereof, wherein said aqueous release coating layer comprises a polymer and an aqueous solution or dispersion of an organic compound having at least one fatty acid ester and at least one quaternary amine, wherein said polymer prevents the migration of said organic compound into the adhesive layer.

2. The article of claim 1 wherein the polymer contains acid functionality.

3. The article of claim 2 wherein the acid functionality is carboxylic acid functionality.

4. The article of claim 1 wherein the organic compound is lecithin.

5. The article of claim 1 wherein the organic compound is an alkylester trimethyl quaternary ammonium salt.

6. The article of claim 5 wherein the organic compound is a tallow trimethyl quaternary ammonium salt.

7. An article comprising a backing layer containing a pressure sensitive adhesive layer affixed to each side of the backing layer and at least one release coat paper layer in contact with the pressure sensitive adhesive layer where the release coat paper layer comprises a polymer and an aqueous solution or dispersion of an organic compound having at least one fatty acid ester and at least one quaternary amine, wherein said polymer prevents the migration of said organic compound into the adhesive layer.

8. The article of claim 7 wherein the polymer contains acid functionality.

9. The article of claim 8 wherein the acid functionality is carboxylic acid functionality.

10. The article of claim 7 wherein the organic compound is lecithin.

11. The article of claim 7 wherein the organic compound is an alkylester trimethyl quaternary ammonium salt.

12. The article of claim 11 wherein the organic compound is a tallow trimethyl quaternary ammonium salt.

* * * * *